United States Patent [19]

Komatsu et al.

[11] Patent Number: 4,611,365
[45] Date of Patent: Sep. 16, 1986

[54] VACUUM CLEANER

[75] Inventors: Takashi Komatsu, Yokaichi; Yasuo Ishino, Tsu, both of Japan

[73] Assignee: Matsushita Electric Industrial Co., Ltd., Japan

[21] Appl. No.: 667,476

[22] PCT Filed: Feb. 10, 1984

[86] PCT No.: PCT/JP84/00038
§ 371 Date: Oct. 10, 1984
§ 102(e) Date: Oct. 10, 1984

[87] PCT Pub. No.: WO84/03031
PCT Pub. Date: Aug. 16, 1984

[30] Foreign Application Priority Data

Feb. 12, 1983 [JP] Japan .................. 58-21913
Feb. 12, 1983 [JP] Japan .................. 58-21914
Feb. 12, 1983 [JP] Japan .................. 58-21915

[51] Int. Cl.⁴ ............................................. A47L 9/28
[52] U.S. Cl. ................................ 15/339; 15/412; 15/377
[58] Field of Search .................... 15/339, 412, 377

[56] References Cited

U.S. PATENT DOCUMENTS 3,579,706 5/1971 Hetland .................... 15/412 X
3,855,665 12/1974 Schwartz .................... 15/339
4,357,729 11/1982 Vander Molen et al. ......... 15/319

FOREIGN PATENT DOCUMENTS 2019338 11/1971 Fed. Rep. of Germany ........ 15/339
3112376 11/1982 Fed. Rep. of Germany ........ 15/339
  51762  4/1977 Japan ...................... 15/339
8104723  5/1982 Netherlands ................ 15/339
2046037 11/1980 United Kingdom .

Primary Examiner—Chris K. Moore
Attorney, Agent, or Firm—Lowe, Price, LeBlanc, Becker & Shur

[57] ABSTRACT

The present invention relates to a vacuum cleaner having a suction motor 13, which is encased in a casing, and a brush motor 12 for driving a brush, which is encased in a floor nozzle. A remote control of the rotational speed of the suction motor 13 is performed by superimposing a signal on two feed wires 32, 33 provided from the casing to the brush motor 14.

7 Claims, 9 Drawing Figures

VACUUM CLEANER

TECHNICAL FIELD

The present invention relates to a vacuum cleaner comprising a casing including a suction fan, a suction motor and a floor nozzle having a motor-driven rotary brush, and a hose and a pipe coupling the nozzle to the suction side of the casing.

TECHNOLOGICAL BACKGROUND

In conventional vacuum cleaners of the type comprising a casing coupled by a hose to a floor nozzle having a rotary brush driven by a motor therein, it is required that power feed lines be led from the casing to the brush motor encased in the floor nozzle.

One current method involves helically winding the feed lines around the hose. However, this results in a hose having reduced flexibility, making it difficulty to operate the floor nozzle.

Another current method utilizes the pair of metal wires which are currently employed to maintain rigidity of the hose as a means for carrying the current to the brush motor. Vacuum cleaners of this type are usually provided at the end of the hose with a device that remotely controls the speed of the suction motor via the reinforcing wires. If such wires are used for brush motor control, no remote control would be possible for the suction motor. One approach would be to provide two pairs of reinforcing wires, the first pair for carrying the current to the brush motor and the second pair for carrying the control current to the suction motor. However, this will result in a loss of flexiblity and ease operation of the hose, difficulty in manufacture, and a high production cost, and in addition, this will require a complex coupling arrangement which connects the reinforcing wires to motor control circuitry, resulting in a bulky cleaner.

DISCLOSURE OF THE INVENTION

According to the present invention, a signal is applied to a pair of wires that run along a hose for carrying the current to a brush motor such that the speed of a suction motor is controlled by the applied signal.

Embodiments of the present invention will now be described with reference to the accompanying drawings.

BRIEF DESCRIPTION OF THE DRAWINGS

The drawings show embodiments of the present invention.

DETAILED DESCRIPTION OF THE PREFERRED EMBODIMENT

Figure 1:
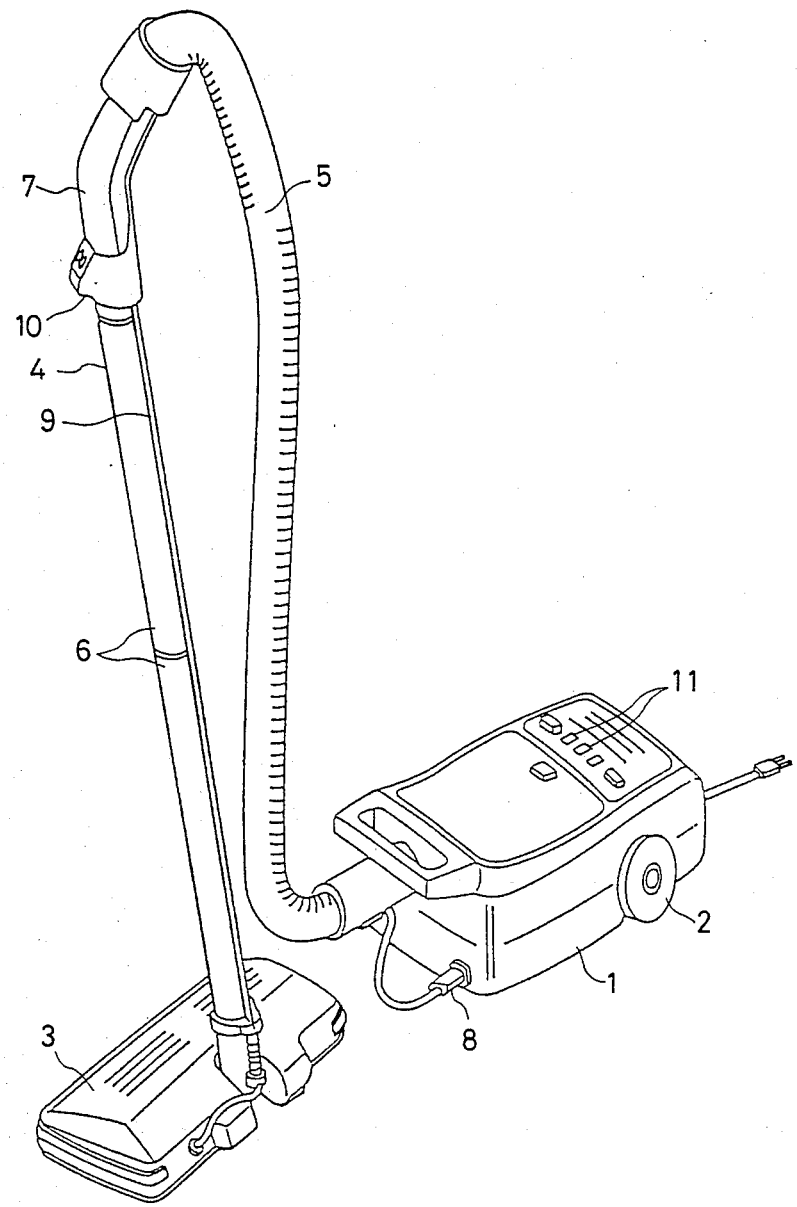
FIG. 1 is a perspective view of an embodiment of the vacuum cleaner of the invention.

Designated at numeral 1 in FIG. 1 is a casing housing a fan driven by a suction motor, a filter arranged at the suction side of the motor, an electrical control unit described hereinafter. The casing 1 has rollers 2 at the bottom portion thereof for it to be easily moved on a surface being cleaned, such as a carpet. A floor nozzle 3 has a rotary brush driven by a motor therein, and a suction passage 4 provides communication between the casing 1 and the floor nozzle 3. Suction passage 4 comprises a flexible hose 5, a pipe 6 which is adjustable in length, and a hand-grip portion 7 connected between hose 5 and pipe 6. Hand-grip portion 7 is integrally connected to the hose 5, and the pipe 6 is detachably connected opposite ends to floor nozzle 3 and hand-grip portion 7. Flexible hose 5 is detachably connected to the suction port of casing 1.

Power is supplied from the casing 1 to a brush motor which is housed in floor nozzle 3, through a plug 8 and through a pair of metal wires helically embedded in hose 5 and, further, through a two-wire cord 9. A remote control device 10 applies a signal to the two metal wires of cord 9 for controlling the speed of the suction motor and which is provided on hand-grip portion 7. An indicator 11 is provided at the upper surface of casing 1 for indicating the operating condition of the suction motor.

Figure 2:
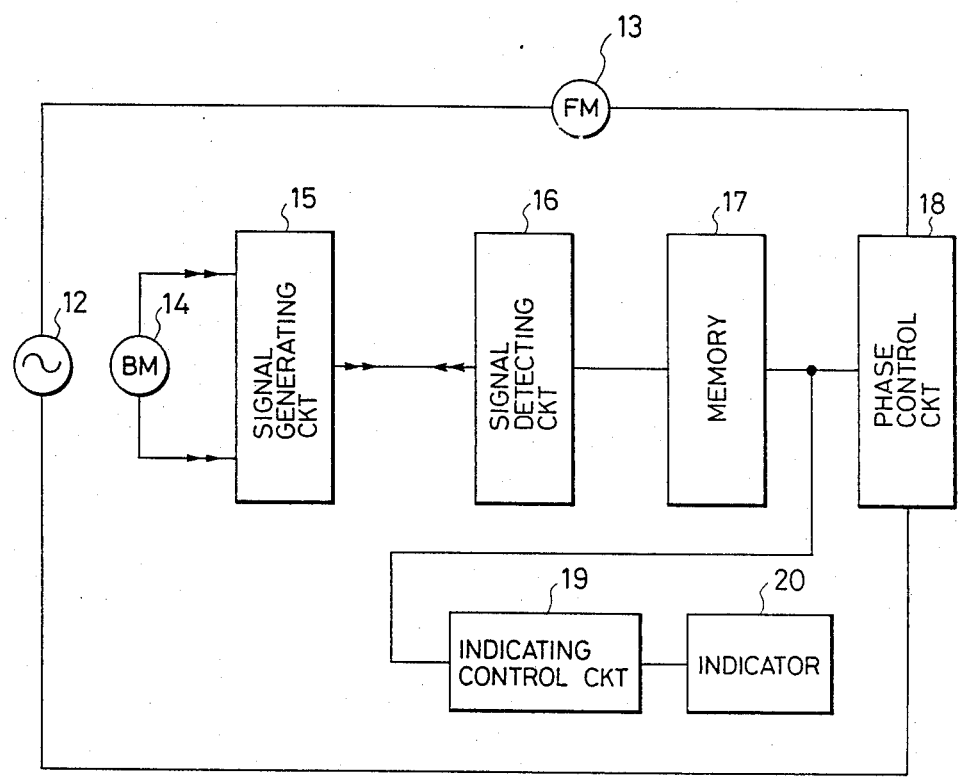
FIG. 2 is a block diagram.

Referring now to FIG. 2, a mains supply 12 supplies power to suction motor 13 of the vacuum cleaner. The brush motor 14 of the floor nozzle 3 is connected to a signal generating circuit 15 operated by the remote control device 10 which is itself connected to a signal detecting circuit 16 for detecting the signal generated by the signal generating circuit 15. A memory 17 stores data relating to the rotational speed of the suction motor corresponding to an output of the signal detecting circuit 16 and its duration; and a phase control circuit 18 responds to the output signal of memory 17. Signal detecting circuit 16, memory 17 and phase control circuit 18 comprise a means whereby the speed of rotation of motor 13 is controlled. This control means is housed in casing 1. 19 represents an indicating control circuit and 20 represents an indicator in the indicating section 11.

When a signal is generated from the signal generating circuit 15 in response to operation of the remote control device 10, the signal is first detected by the signal detecting circuit 16 which supplies a signal corresponding to the state of the detected signal and the detected time. The memory 17 stores data indicating motor speeds corresponding to the output signal of the signal detecting circuit 16. The output of the memory 17 drives phase control circuit 18 which controls the speed of suction motor 13. The output of memory 17, i.e. the speed of motor 13 is also indicated on the indicator 20 by the indicating control circuit 19.

Figure 3:
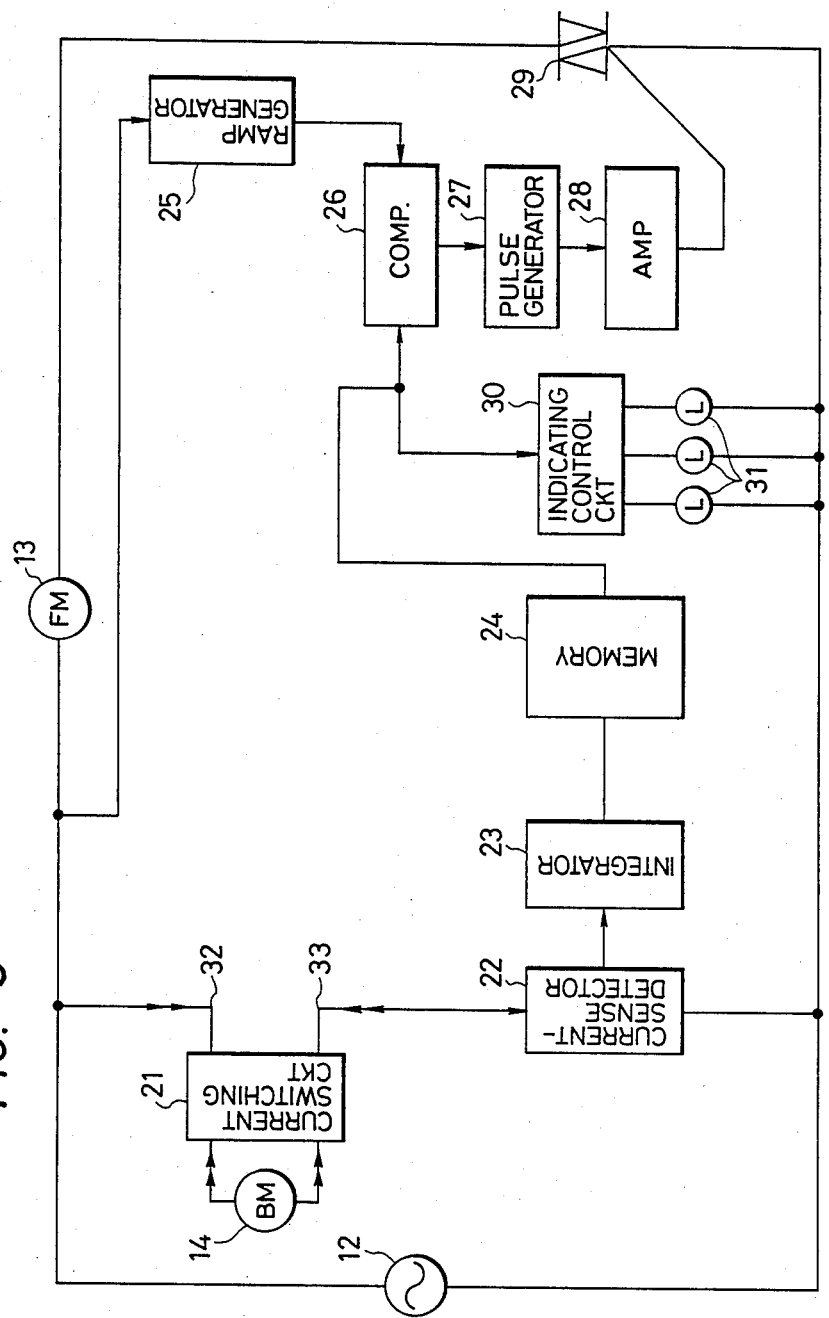
FIG. 3 is a block diagram showing a whole circuit.

With reference to FIG. 3, 21 is a current switching circuit for changing the direction of current flow and a current-sense detector 21 detects the direction of the current. An integrator 23 converts the output of current-sense detector 20 to a DC voltage. 24 designates a memory 25 is a ramp generator for generating a sawtooth wave having a frequency twice the frequency of the mains supply 12. A comparator 26 compares the output of memory 24 with the output of ramp generator 25 and a pulse generator 27 generates pulses when the output of the memory 24 corresponds to the output of the ramp generator 25. An amplifier circuit 28 amplifies pulses supplied from the pulse generator 27 and a bidirectional thyristor is triggered by a pulse supplied from the amplifier 28. An indicating control circuit 30 controls lamps 31, such as LED or the like, in accordance with the output of memory 24.

The circuit of FIG. 3 corresponds to the circuit of FIG. 2 as follows. The current switching circuit 21 corresponds to the signal generating circuit 15; current-sense detector 22 and integrator 23 correspond to the signal detecting circuit 16; memory 24 corresponds to memory 17; and ramp generator 25, comparator 26, pulse generator 27, amplifier 28, and bidirectional thyristor 29 correspond to phase control circuit 18.

In the above-mentioned arrangement, when current switching circuit 21 is operated, a current is passed through current-sense detector 22 in positive or negative direction and either positive or negative voltage is accordingly obtained at the output of integrator 23. The output of memory 24 is increased or decreased in accordance with the output voltage of integrator 23. The output of memory 24 is fed to the comparator circuit 26 and to the indicating control circuit 30.

Comparator circuit 26 is further coupled to the ramp generator 25 to generate an output signal when the output of ramp generator 25 corresponds to the output of memory 14. This output signal is converted to a pulse signal by pulse generator 27, the pulse signal being amplified by amplifier 28 to trigger bidirectional thyristor 29. The indicating control circuit 30 functions to selectively energize lamps 31 in accordance with the output of memory circuit 24.

When current switching circuit 21 is not operated, an AC flows through current-sense detector 22 which produces zero output.

Figure 4:
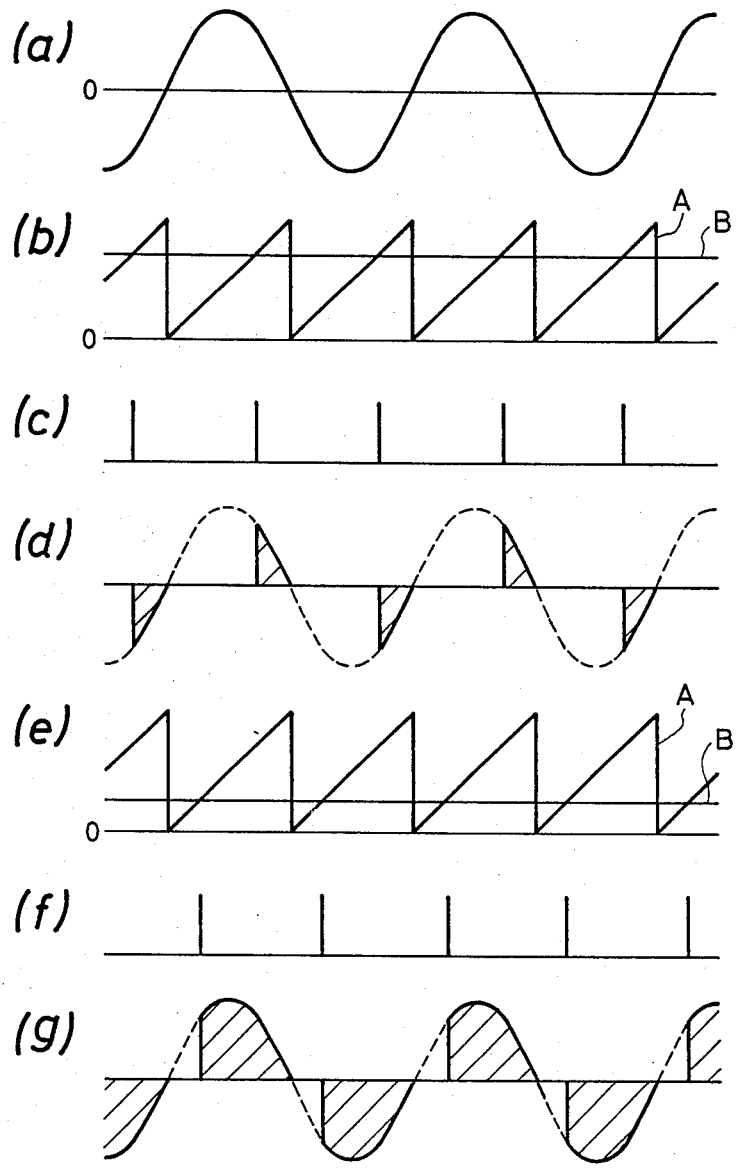
FIGS. 4a to 4g show waveforms.

The operation of the phase control section will be described with reference to FIG. 4. In FIG. 4, (a) shows the voltage waveform of the mains supply; (b) depicts a sawtooth waveform A in relation to an output voltage B of memory 24 when suction motor 13 rotates at a low speed; (c) represents the pulses generated by the pulse generator; (d) is the waveform of voltage applied to suction motor 13; (e) shows the sawtooth waveform A and an output voltage B of memory 24 when suction motor 13 rotates at a high speed; (f) shows the output of the pulse generator; and character (g) shows the waveform of voltage applied to suction motor 13. When the output B of memory 24 is high as illustrated at (b), the voltage applied to suction motor 13 goes low as illustrated at (d), and the speed of motor 13 decreases. When the output B of memory 24 is low as shown at (e), the voltage applied to suction motor 13 goes high as illustrated at (g), and the motor speed increases. As a result, the speed of suction motor 13 can be controlled as a function of the output of memory 24.

It is seen from FIGS. 1 to 4 that the speed of suction motor 13 can be controlled by operating the remote control device 10.

The two metal wires embedded in a wall of the hose 5 of FIG. 1 correspond to lines 32 and 33 in FIG. 3.

Figure 5:
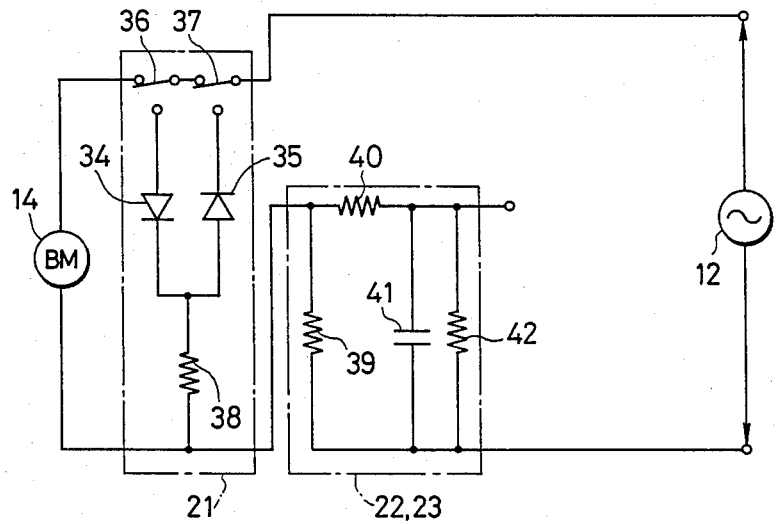
FIGS. 5 and 6 are circuit diagrams showing a signal generating section and a signal detecting section respectively.

FIG. 5 shows detailed arrangements of the current switching circuit 21, current-sense circuit 22, and integrator 23 of FIG. 3. Current switching circuit 21 comprises diodes 34 and 35 which are connected so that one electrode of each diode is coupled to an electrode of opposite sense of the other, switches 36 and 37 which are respectively associated with the diodes 34 and 35, and a resistor 38 which is connected in series to diodes 34 and 35. Current-sense detector 22 and integrator 23 comprise a resistor 39, a series circuit of resistor 40 and capacitor 41 connected in parallel with resistor 39, and a resistor 42 in parallel with capacitor 41.

When diodes 34 and 35 are not connected to switches 36 and 37, the circuit for brush motor 14 completes to energize brush motor 14. In this case, current flows in opposite directions (positive and negative directions) through integrator 23 and the voltage across resistor 42 becomes zero. When switch 36 is operated so that diode 34 is connected to the mains supply 12, current from the mains supply 12 flows in the positive direction via diode 34 and the resistors 38 and 39, and therefore positive DC voltage develops across resistor 42. When switch 37 is operated, negative DC voltage develops across resistor 42.

According to the circuit of FIG. 5, brush motor 14 is de-energized during the operation of switches 36 and 37. However, when these switches are operated briefly, the de-energization of brush motor does not materially affect the utility of the cleaner.

Figure 6:
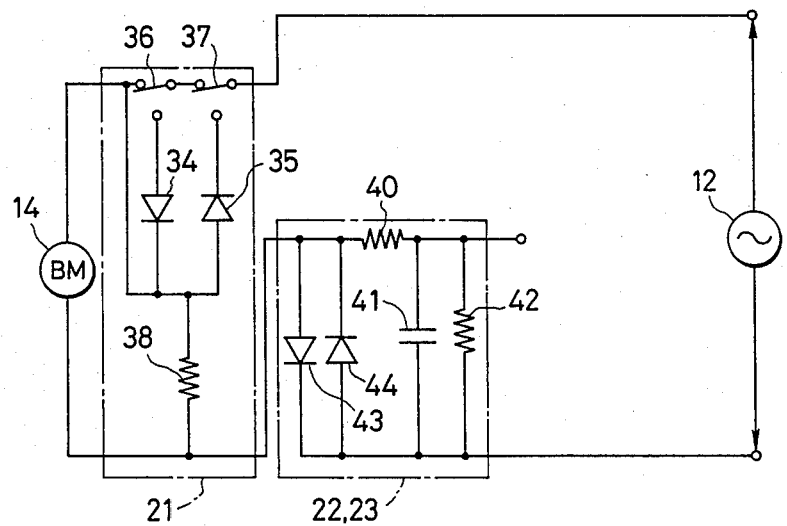

FIG. 6 shows an arrangement in which diodes 43 and 44 are used instead of the resistor 39 of FIG. 5. Diodes 43 and 44 are connected in anti-parallel relationship. The operation of this circuit is similar to the circuit of FIG. 5. However, use of diodes 43 and 44 reduces heat dissipation. Furthermore, since one end of brush motor 14 is connected to a junction between resistor 38 and diodes 34 and 35, brush motor 14 is driven at low speed while either of the switches 36 and 37 is switched into connection to diodes 34 and 35.

Figure 7:
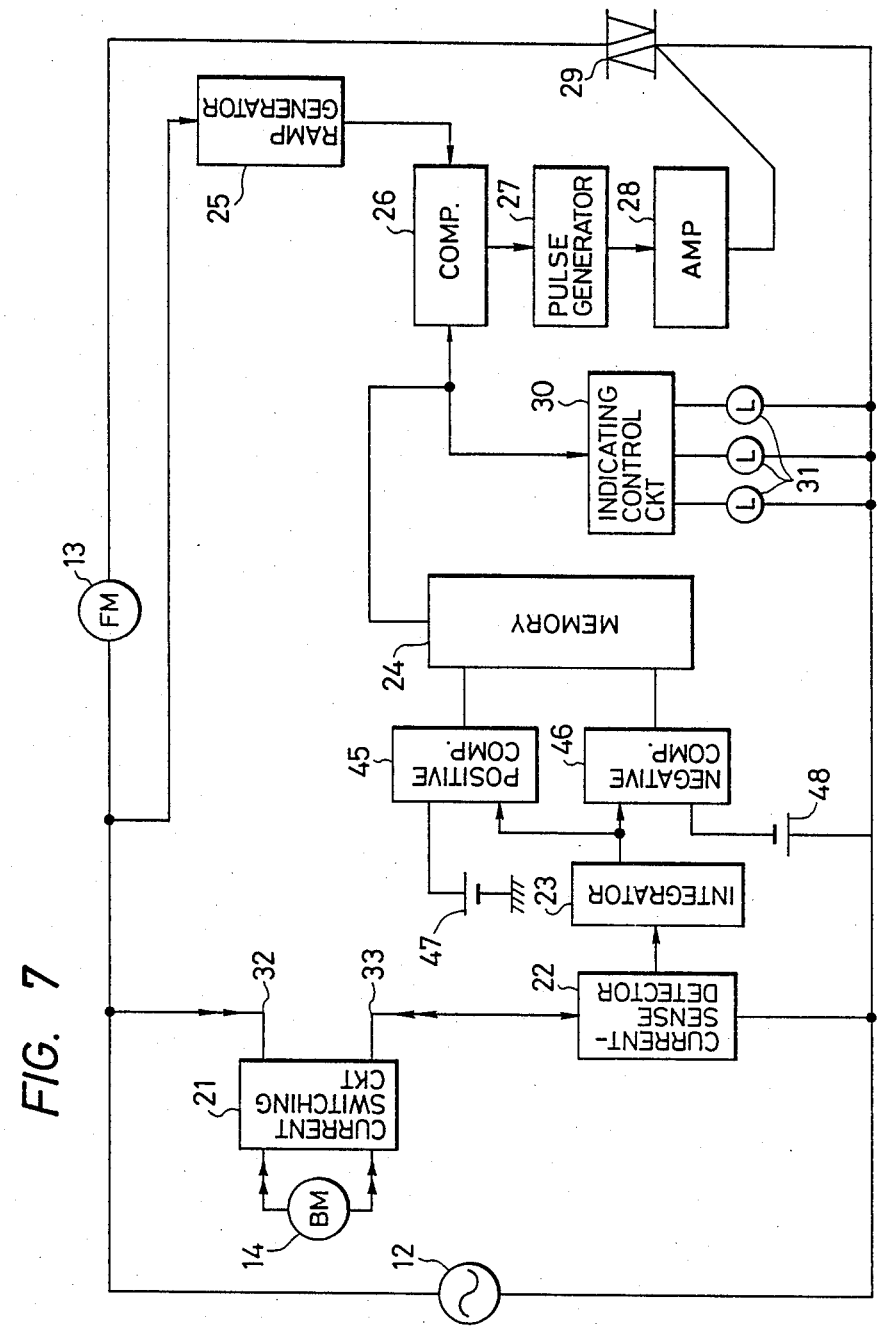
FIG. 7 is a circuit diagram showing another embodiment of the invention.

FIG. 7 shows an arrangement in which a positive comparator 45 for detecting a positive current flow and a negative comparator 46 for detecting a negative current flow are connected to resistor 42 of integrator. 47 and 48 are the positive and negative reference voltage sources, respectively coupled to he positive and negative comparators 45 and 46. The output of the integrator 23 is connected as a common input signal to the inverting terminal of positive comparator 45 and the noninverting terminal of negative comparator 46. Negative reference voltage is applied to the noninverting terminal of positive comparator 45 and the positive reference voltage is applied to the inverting terminal of the negative comparator 46.

When switch 36 is switched into connection with diode 34, a positive DC voltage develops across resistor 42. When this voltage becomes higher than the positive reference voltage, the output of positive comparator 45 switches to a high voltage level. When switch 37 is switched into connection with diode 35, a negative DC voltage develops across resistor 42 and negative comparator 46 produces a high voltage output.

According to a feature of the invention the operation of the FIG. 7 circuit is not likely to be affected by noise even if the voltage developed across resistor 42 is considerabley low.

Figure 8:
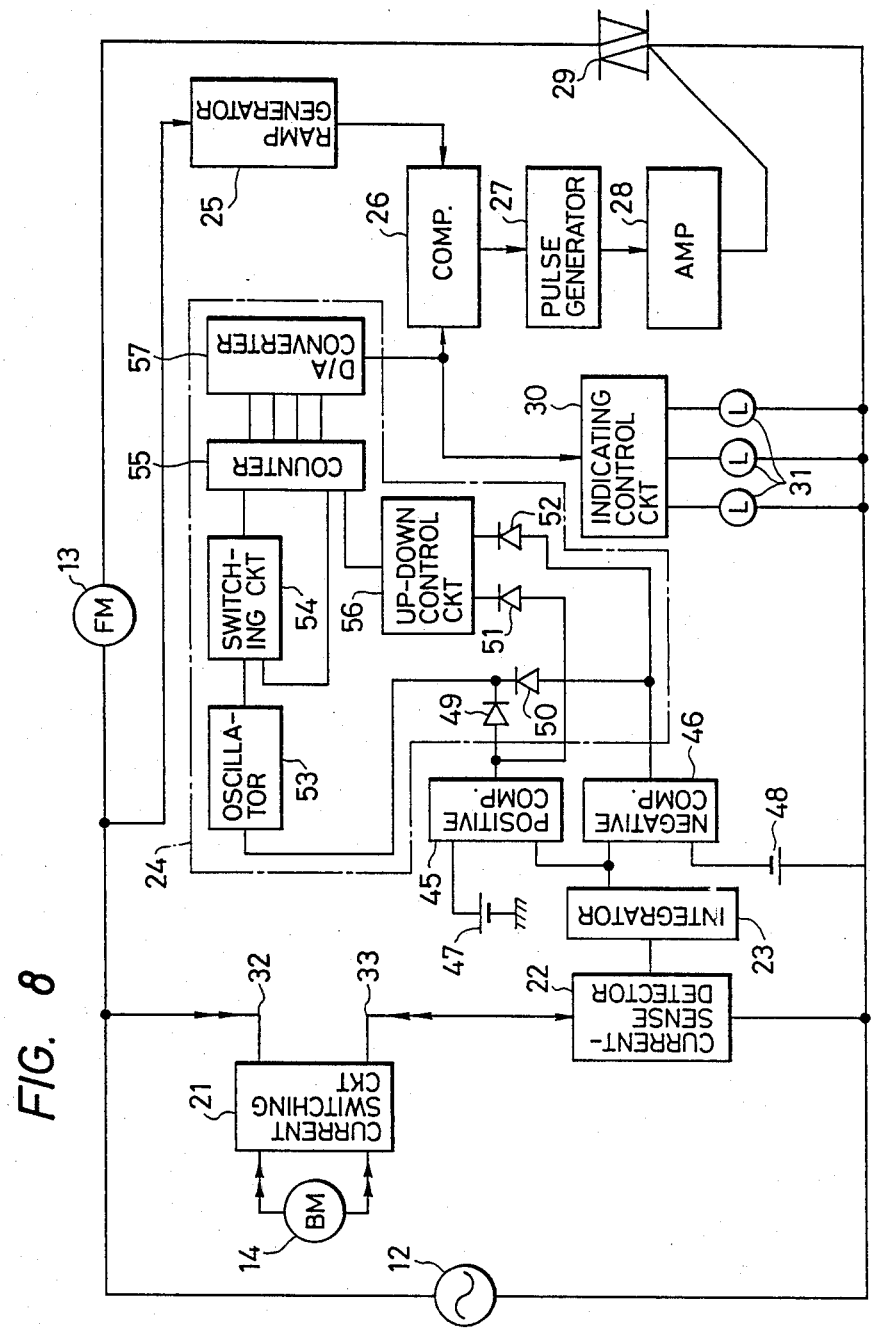
FIG. 8 is a circuit diagram showing yet another embodiment of the invention.

FIG. 8 shows one specific embodiment of the memory 24. Designated at 49, 50, 51 and 52 are diodes for switching the outputs of positive comparator 45 and negative comparator 46. An oscillator 53 acts in response to a signal switched through diodes 49 to 52. A switching circuit 54 functions to disable the output of oscillator 53 when a counter 55 is full or empty. The counter 55 is arranged to increase or decrease its count value in response to the output of the oscillator 53. An up-down control circuit 56 determines the direction of count in counter 55. A D/A converter 57 converts the digital output of counter 55 to an analog signal.

Diodes 49 and 50 have the function of enabling oscillator 53 in response to either output of the positive comparator 45 or negative comparator 46, and the diodes 51 and 52 have the function of enabling the outputs of comparators 45 and 46 to up-down control circuit 56.

In response to a positive signal, the up-down control circuit 56 causes counter 55 to increment and in response to a negative signal it causes the counter to decrement. Oscillator 53, enabled either in response to positive or a negative signal, clocks counter 55 via switching circuit 54 to increment or decrement its count depending on the output of up-down control circuit 56. When counter 55 is either full or empty, switching circuit 54 inhibits the output of oscillator 53 being applied to counter 55. The count value of counter 55 is converted to an analog signal by D/A converter 57 and fed to one input of the comparator 26 and to the indicating control circuit 30. The output of ramp generator 25 is coupled to the other input terminal of the comparator 26 for comparison with the output of D/A converter 57 to provide a signal when the input signals correspond with each other. The output signal of the comparator 26 is shaped into a pulse signal by pulse generator 27 and amplified for triggering the bidirectional thyristor 29.

Figure 9:
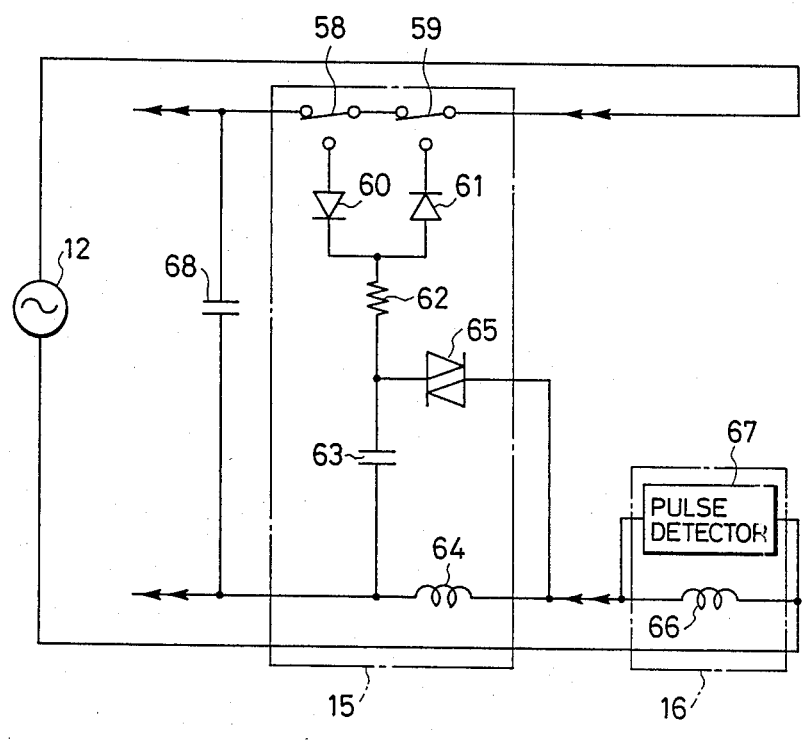
FIG. 9 is a circuit diagram showing a signal generating section and a signal detecting section of FIG. 8.

FIG. 9 shows another example of the signal generating circuit 15 and signal detecting circuit 16 of FIG. 1. The signal generating circuit 15 includes switches 58 and 59 each of which opens and closes the feed lines. Diodes 60 and 61 are connected in parallel in opposite sense to switches 58 and 59. A series circuit formed by a current limiting resistor 62 and a capacitor 63 is connected to diodes 60 and 61. A trigger element 65 has one electrode connected to capacitor 63 and the other electrode connected to inductance 64. On the other hand, the signal detecting circuit 16 comprises an inductor 66 and a pulse detecting circuit 67 which is connected in parallel to inductor 66. A capacitor 68 is provided for transmitting pulses to the casing in the case where a brushless floor nozzle is used.

When switch 58 is operated, diode 60 is switched into circuit with capacitor 63 so that the latter is charged in a positive direction. When the voltage developed in capacitor 63 exceeds the breakdown voltage of trigger element 65, causing it to conduct, the energy stored in capacitor 63 is discharged through inductor 64 and a pulse is generated across the inductor 64 during positive halfwaves. This pulse appears across inductor 66 and is detected by pulse detector 67. When switch 59 is operated, coupling diode 61 into circuit with capacitor 63, inductor 64 generates a pulse only during negative halfwaves which is also detected by pulse detector 67.

As will be seen from the embodiments described above, the speed of the suction motor is remote-controlled by application of a signal to power feed lines which are coupled to the brush motor of a floor nozzle.

While mention is made of a signal generating circuit which alters the direction of current to control the speed of suction motor, the invention could be modified so that the mains AC current is rectified into a current that flows only in one direction, whereby the motor speed varies recyclically between maximum and minimum values. In such a modification, a current switching circuit is required to provide single-polarity conversion. In essence, the vacuum cleaner as taught by the invention superimposes a signal to power feed lines of a brush motor to effect the remote control of a the rotational speed of suction motor.

INDUSTRIAL APPLICATION

As described above, in a vacuum cleaner according to the present invention, remote control of the rotational speed of a suction motor housed in a casing is performed through the use of feed wires provided from the casing to a brush motor of a floor nozzle, thus enhancing the utility of the vacuum cleaner.

Furthermore, the number of feed wires required is reduced to a minimum. This retains the hose in the required level of flexiblity and provides ease with which it can be manufactured at a low cost, and allows compact design for electrical connections. The present invention thus provides a number of advantages for industrial applications.

It should be apparent from the preceding that the invention may be practiced otherwise than as specifically described and disclosed herein. Modifications may, therefore, be made to the specific embodiment disclosed here without departing from the scope of this invention and are intended to be included within the claims appended below.

What is claimed is:

1. A vacuum cleaner comprising:
   a motor fan suction unit including a suction motor;
   a floor brush unit including a brush motor;
   a suction passage for establishing communication between said motor fan suction unit and said floor brush unit;
   a pair of current carrying conductor wires for connecting said brush motor to a source of alternating current;
   a remote control unit provided on said suction passage and coupled to said conductor wires so that the alternating current flows therethrough, said remote control unit having means for generating a control signal; and
   circuit means coupled through said conductor wires to said remote control unit for controlling the rotational speed of said suction motor in response to the generated control signal.

2. A vacuum cleaner as claimed in claim 1, wherein said control signal generating means superimposes a pulse signal on the alternating current passing through said conductor wires.

3. A vacuum cleaner as claimed in claim 2, wherein said control signal generating means has an inductor.

4. A vacuum cleaner as claimed in claim 1, wherein a portion of said suction passage is made up of a flexible hose and said pair of conductor wires are embedded in a wall of said flexible hose.

5. A vacuum cleaner as claimed in claim 1, further comprising an indicating control circuit coupled to said rotational speed control circuit means, for indicating the rotational speed of said suction motor by means of an indicator.

6. A vacuum cleaner comprising:
   a motor fan suction unit including a suction motor;
   a floor brush unit including a brush motor;
   a suction passage for establishing communication between said motor fan suction unit and said floor brush unit;
   a pair of current carrying conductor wires for connecting said brush motor to a source of alternating current;

a remote control unit provided on said suction passage and coupled to said conductor wires so that the alternating current flows therethrough, said remote control unit having means for generating a control signal; and circuit means coupled through said conductor wires to said remote control unit for controlling the rotational speed of said suction motor in rsponse to the generated control signal, said circuit means comprising a signal detecting circuit for detecting the generated control signal, a memory for storing the rotational speed of said suction motor corresponding to an output of said signal detecting circuit, and a phase control circuit energized in response to an output of said memory.

7. A vacuum cleaner comprising:

a motor fan suction unit including a suction motor;

a floor brush unit including a brush motor;

a suction passage for establishing communication between said motor fan suction unit and said floor brush unit;

a pair of current carrying conductor wires for connecting said brush motor to a source of alternating current;

a remote control unit provided on said suction passage and coupled to said conductor wires so that the alternating current flows therethrough, said remote control unit having means for generating a control signal, said control signal generating means comprising two diodes connected to each other in parallel in opposite directions and switched by switches; and circuit means coupled through said conductor wires to said remote control unit for controlling the rotational speed of said suction motor in response to the generated control signal, said rotational speed control circuit means comprising a current-sense detector for detecting the direction of current from said control signal generating means, an integrator for converting an output of said current-sense detector into a direct current, two comparators which are coupled to said integrator and to which positive or negative voltage is applied, an oscillator operated by outputs of said comparators, a switching circuit energized by an output of said oscillator, a counter for counting outputs of said oscillator, an up-down control circuit for increasing or decreasing the value of said counter, D/A converter for a digital signal output of said counter to an analog signal output, a pulse generator for generating a pulse when an output of said D/A converter corresponds to an output of a ramp generator generating a sawtooth wave in a cycle similar to a half cycle of an alternating-current power source, an amplifier for amplifying an output pulse of said pulse generator, and a bidirectional thyristor triggered by an output pulse of said amplifier.

* * * * *